(12) United States Patent
Tixier et al.

(10) Patent No.: US 10,072,922 B2
(45) Date of Patent: Sep. 11, 2018

(54) CALIPER SENSOR AND METHOD USING MID-INFRARED INTERFEROMETRY

(71) Applicant: Honeywell Limited, Mississauga (CA)

(72) Inventors: Sebastien Tixier, North Vancouver (CA); Michael Kon Yew Hughes, Vancouver (CA); Stephane Savard, Vancouver (CA)

(73) Assignee: Honeywell Limited, Mississauga (CA)

( * ) Notice: Subject to any disclaimer, the term of this patent is extended or adjusted under 35 U.S.C. 154(b) by 24 days.

(21) Appl. No.: 15/403,197

(22) Filed: Jan. 11, 2017

(65) Prior Publication Data

US 2017/0131087 A1  May 11, 2017

Related U.S. Application Data

(62) Division of application No. 14/103,733, filed on Dec. 11, 2013, now Pat. No. 9,581,433.

(51) Int. Cl.
  *G06F 15/00* (2006.01)
  *G01B 5/02* (2006.01)
  (Continued)

(52) U.S. Cl.
  CPC ...... *G01B 11/0691* (2013.01); *G01B 9/02001* (2013.01); *G01B 11/0633* (2013.01);
  (Continued)

(58) Field of Classification Search
  None
  See application file for complete search history.

(56) References Cited

U.S. PATENT DOCUMENTS 5,289,266 A     2/1994  Shih
9,140,542 B2 *  9/2015  Savard .............. G01B 11/0625
                (Continued)

FOREIGN PATENT DOCUMENTS

DE      3509512 A1    9/1986
DE     19520094 A1   12/1996
                (Continued)

OTHER PUBLICATIONS

JP 2004 101505A Machine Translation.
JP H03 183903A Machine Translation.

*Primary Examiner* — David M Gray
*Assistant Examiner* — Geoffrey T Evans
(74) *Attorney, Agent, or Firm* — Charles H Jew

(57) ABSTRACT

Non-contacting caliper measurements of free standing sheets such as porous polymer and paper detect mid-IR interferometric fringes created by the reflection of light from the top and bottom surfaces of the sheet. The technique includes directing a laser beam at a selected angle of incidence onto a single spot on the exposed outer surface wherein the laser beam comprises radiation having a wavelength in the 3-50 micron range and scanning the laser beam through a selected angle range as the laser beam is directed onto the exposed outer surface and measuring the intensity of an interference pattern that forms from the superposition of radiation that is reflected from the exposed outer surface and from the inner surface. Thickness can be extracted from the fringe separation in the interference pattern. Rotating and focusing elements ensure that the spot position on the sheet remains the same while varying the incident angle.

20 Claims, 4 Drawing Sheets

(51) Int. Cl.
  *G01B 7/02*   (2006.01)
  *G01B 11/02*   (2006.01)
  *G01B 13/02*   (2006.01)
  *G01B 11/06*   (2006.01)
  *G01B 9/02*   (2006.01)

(52) U.S. Cl.
  CPC ...... *G01B 11/0675* (2013.01); *G01B 2210/42* (2013.01); *G01B 2210/44* (2013.01); *G01B 2290/65* (2013.01)

(56) References Cited

U.S. PATENT DOCUMENTS

| | | | |
|---|---|---|---|
| 9,927,366 B2 * | 3/2018 | Tixier | G01N 21/8422 |
| 2015/0253127 A1 * | 9/2015 | Hughes | G01B 11/0625 250/358.1 |
| 2018/0172432 A1 * | 6/2018 | Hughes | G01B 11/0625 |

FOREIGN PATENT DOCUMENTS

| | | |
|---|---|---|
| JP | H03183903 A | 8/1991 |
| JP | 2004101505 A | 4/2004 |

* cited by examiner

CALIPER SENSOR AND METHOD USING MID-INFRARED INTERFEROMETRY

REFERENCE TO RELATED APPLICATION

This application is a divisional application of U.S. patent application Ser. No. 14/103,733 which was filed on Dec. 11, 2013.

FIELD OF THE INVENTION

The present invention relates generally to interferometry techniques for non-contacting thickness or caliper measurements of a moving sheet such as porous polymer and paper and more particularly to methods of detecting mid-IR interferometric fringes created by the reflection of light from the top and bottom surfaces of the sheet and thereafter extracting the thickness from the fringe separation.

BACKGROUND OF THE INVENTION

Caliper is one of the most important quality specifications of paper and plastic products. Traditional commercial on-line caliper measurement requires the measuring heads to physically touch the web. Contacting the web causes a number of issues with the two most significant ones being the marking of the sheet and the accumulating of dirt on the measuring heads, which leads to measurement drift and inaccuracy. More advanced techniques make use of laser triangulation or confocal microscopy techniques but they still require a measuring head to contact one side of the web. Moreover, prior art optical techniques are not suitable to all paper products because they are very sensitive to the scattering properties of the sheet. In addition, achieving better than 1 micron accuracy is a challenge as these techniques rely on the difference between two independent distance measurements. As such, both measurements must be stable with respect to each other in order to attain the required profile accuracy. This is difficult to achieve in the paper scanner environment where the measurement heads are exposed to frequent temperature changes and the positions of the paper and heads are subject to constant fluctuations. The art is desirous of developing reliable on-line techniques for accurately measuring the thickness web materials during production.

SUMMARY OF THE INVENTION

The present invention is based in part on the demonstration that mid-IR interferometry is particularly effective in measuring web thickness. In one aspect, the invention is directed to a method of measuring the thickness of a web, which has a first side and a second side, that includes the steps of:

supporting the web so that the web has a free standing portion where the web has an exposed outer surface on the first side and an inner surface on the second side;

directing a laser beam at a selected angle of incidence onto a single spot on the exposed outer surface wherein the laser beam comprises radiation having a wavelength typically in the 3-50 micron and preferably in the 8-25 micron range;

scanning the laser beam through a selected angle range as the laser beam is directed onto the spot on the exposed outer surface;

measuring the intensity of an interference pattern that forms from the superposition of radiation that is reflected from the exposed outer surface and from the inner surface; and extracting the thickness of the web from the fringe separation in the interference pattern. Preferred extraction techniques include regression analysis by least-squares fitting of the interference pattern intensity with laser beam angle to an established relationship by using web thickness as the variable parameter. Another technique measures the occurrence of interference minima.

A preferred technique of obtaining the thickness is by fitting the interference pattern to the formula given by the relationship, $$I = A \cos(\delta) \quad (1)$$

where I is the measured intensity, A is the amplitude of the interference pattern and $\delta$ is the phase difference between the radiation reflected from the outer surface and the radiation reflected from the inner surface. The phase difference $\delta$ is $$\delta = \frac{4\pi d}{\lambda_0} \sqrt{(n_2^2 - n_1^2 \sin^2 \theta_1)} - \pi \quad (2)$$

The phase difference is expressed in terms of incident angle ($\theta_1$), wavelength ($\lambda_0$), index of refraction of the air ($n_1$), index of refraction of the web ($n_2$) and web thickness (d), wherein angle, wavelength and indices are known, and web thickness is taken as a variable parameter, such as by finding the least-square error by adjusting a variable, which is the thickness.

In another aspect, the invention is directed to a non-contacting caliper sensor, for measuring the thickness of a sheet of scattering material having a first side and a second side, that includes:

a laser that provides a beam of incident radiation;

means for directing the incident radiation toward a single spot on an exposed outer surface on an exposed surface on the first side of the sheet wherein the incident radiation reaches the exposed surface at an angle of incidence of from 0 to 60 degrees;

means for detecting an interference pattern which forms by interference between first radiation reflected from the exposed outer surface and second radiation reflected from an inner surface of the second side; and means for analyzing the interference pattern to calculate the thickness of the sheet.

In a preferred embodiment, radiation in the mid-infrared wavelength (3-50 microns), which is preferably in the 8-25 micron range, is directed into the paper web and interferometric fringes created by the reflection of the light at the top and bottom surfaces of the web are recorded. In comparison with radiation of shorter wavelengths, mid-IR wavelengths are less affected by scattering in the paper which makes the inventive technique suitable to applications unsuitable to prior art techniques. Web thicknesses in the range of 20 microns to 2-3 mm can be measured if the caliper sensor wavelength is extended to the far-IR (typically having a wavelength of 50 microns to 1 mm) or terahertz range (typically having a wavelength of 100 microns to 1 mm). The web does not come into contact with the measurement head in which the caliper sensor is positioned. The measurement can be performed in a reflection geometry requiring only one measurement head.

DETAILED DESCRIPTION OF THE PREFERRED EMBODIMENTS

The present invention relates to non-contact sensor devices for measuring the thickness of a film, web or sheet. While the sensor will be illustrated in calculating the caliper of paper, it is understood that the sensor can measure thickness of a variety of flat materials including, for example, coated materials, plastics, fabrics, and the like. The sensor is particularly suited for thickness detection of porous polymers (plastic) made of polyethylene, polypropylene, polyethylene terephthalate, polytetrafluoroethylene or polyvinyl chloride.

Figure 1:
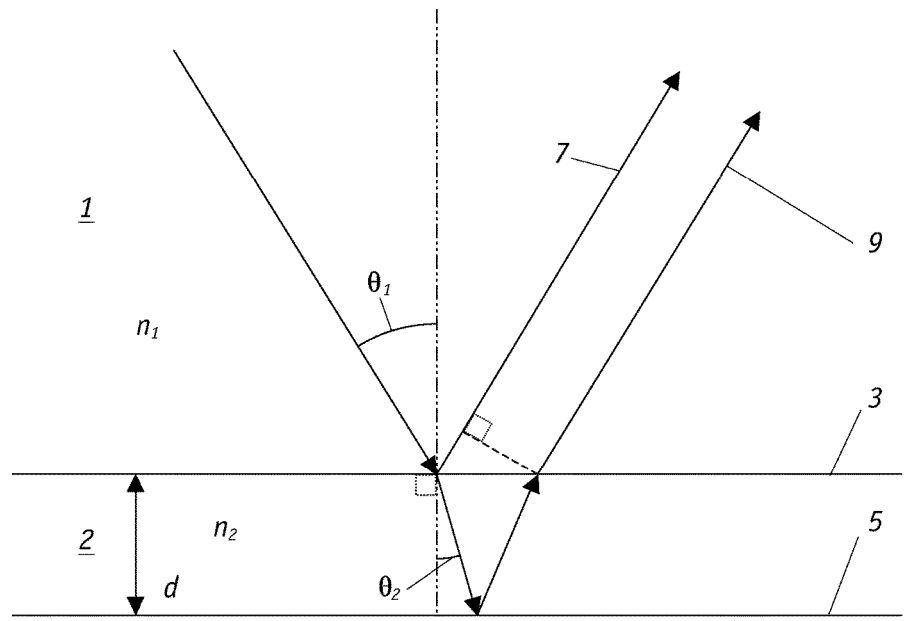
FIG. 1 illustrates a beam directed at a web and the scatter of the beam by the top and lower surfaces of the web.

FIG. 1 illustrates the electromagnetic radiation beam geometry incident, reflected and refracted on a web product 2 of thickness d and having upper and lower sides or planes, plane 3 and plane 5, from which the incident electromagnetic radiation of wavelength $\lambda_0$ is reflected. In addition, the portion of the incident electromagnetic radiation propagating into the web is refracted since the index of refraction is different on different sides of plane 3. The distance between upper (plane 3) and lower (plane 5) sides is d. The index of refraction of the air around the web is $n_1$ and the index of refraction within the web is $n_2$. The optical path length difference between beam 7 and beam 9 is $\Delta = 2n_2 d \cos\theta_2$. The corresponding phase difference is $\delta = k_0 \Delta - \pi$, where $k_0 = 2\pi/\lambda_0$. Interference minima occur at $$\delta = (2m+1)\pi, \text{ where } m=0,1,2,\ldots \quad (3)$$

For instance, assuming that the mean incident angle is 45°, the wavelength of a laser light used is 15 μm, the web thickness is 80 μm and the index of refraction is 1.5, a range of ±7° in incident angle is required to measure 1 period of the interference.

In operation, once the interference pattern is obtained, standard techniques can be implemented to ascertain the web thickness. One method of extracting the material thickness and index of refraction from the spectra is to fit the angular spectra using the interference relationship given in equation 1 above. The thickness d and index $n_2$ can be extracted from the fit. Another method is to record the angles of the zero crossings or interference minima which occur when equation 3 is satisfied. By plotting the values of $\sin^2\theta_1$ at the zero crossing as a function of $m^2$, a line of slope $(\lambda_0/2dn_1)^2$ and intercept $(n_2/n_1)^2$ are obtained. Web thickness, d, can be calculated. Assuming that $n_1$, typically air ($n_1=1$), is known then the index of refraction of the material $n_2$ can be calculated. The thickness is typically calculated after implicitly or explicitly calculating the index of refraction of the web.

Figure 2:
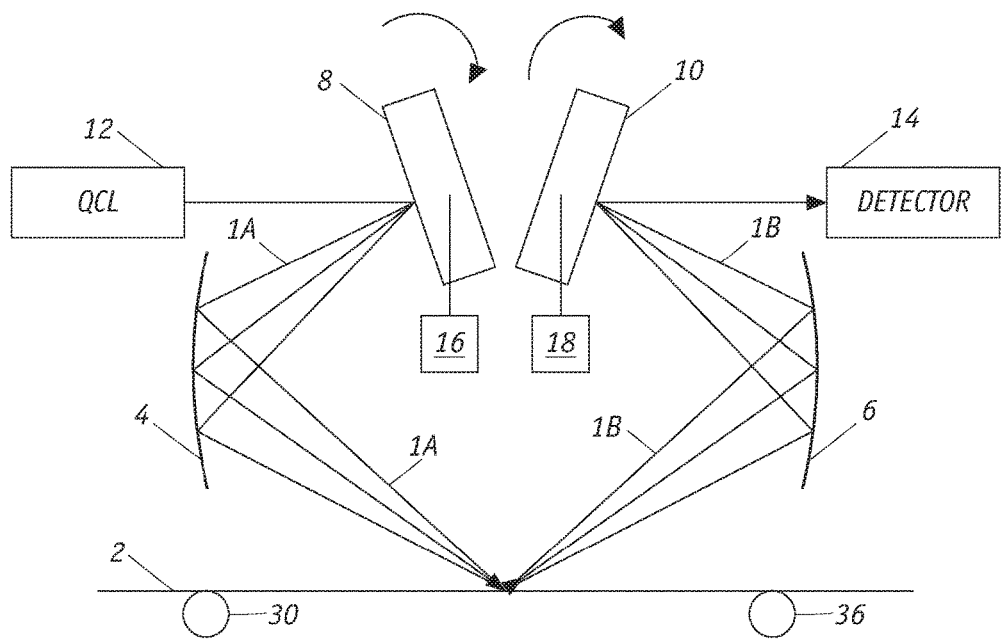
FIGS. 2 to 6 show different embodiments of the caliper sensor.

The caliper sensor of the present invention preferably uses a quantum cascade laser (QCL) operating at a fixed wavelength in the 8-25 micron range. A suitable QCL is commercially available from Daylight Solutions, Inc. (San Diego, Calif.). The laser beam is preferably directed at the web being monitored at an angle in the range of 0 to 60 degrees and the specular intensity is measured. FIG. 2 shows a caliper sensor that includes a stationary QCL 12, a pair of turning mirrors 8, 10, a pair of relay mirrors 4, 6 and stationary detector 14 that are positioned on the same side of moving web 2 which is supported by rollers 30, 36. Turning mirrors 8 and 10 are mounted to rotational mechanisms 16 and 18, respectively. In operation, QCL 12 generates a laser beam 1A that is directed toward turning mirror 8, which is shown to be in a first position, so that reflected beam 1B is directed by relay mirror 4 onto a stationary position on moving web 2. Reflected radiation 1B from web 2 is directed into detector 14 by relay mirror 6 and turning mirror 10. Detector 14 can comprise a photodiode that measures the intensity of the radiation captured. Each of the relay mirrors is preferably a stationary, single conventional concave spherical mirror. Subsequently, turning mirrors 8 and 10 are rotated to their respective second positions so that incident radiation reaches the web at a different angle than that of the initial beam 1A. The scanning process continues until the entire range covered. Suitable detectors include, for example, a HdCdTe (mercury cadmium telluride) solid state detector.

Figure 3:
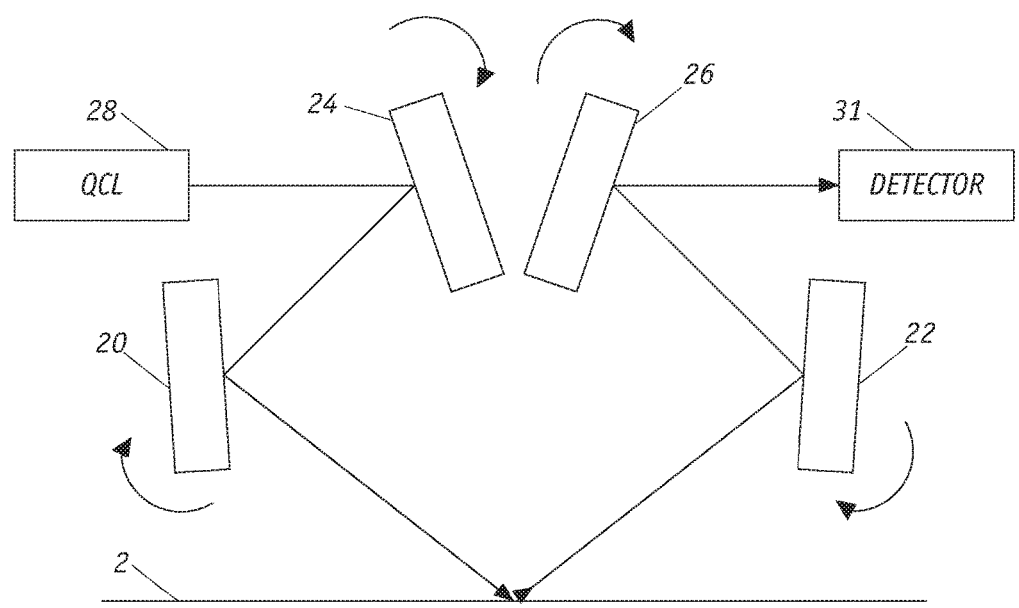

FIG. 3 illustrates another configuration of the caliper sensor that includes a QCL 28, turning mirrors 20, 22, 24 and 26, and detector 31 that are positioned on the same side of moving web 2. Each turning mirror is mounted to a rotational mechanism, which can be the same configuration as that shown in FIG. 2. The orientations of the four turning mirrors are coordinated so as to permit radiation from QCL 28 to be scanned onto a stationary position on web 2 over a predetermined angle range. In a preferred embodiment as shown in FIG. 2, turning mirror pairs 24 and 26 are arranged symmetrically and similarly turning mirror pairs 20 and 22 are arranged symmetrically. In this fashion, the mirrors in each pair are rotated through the same angles.

Figure 4:
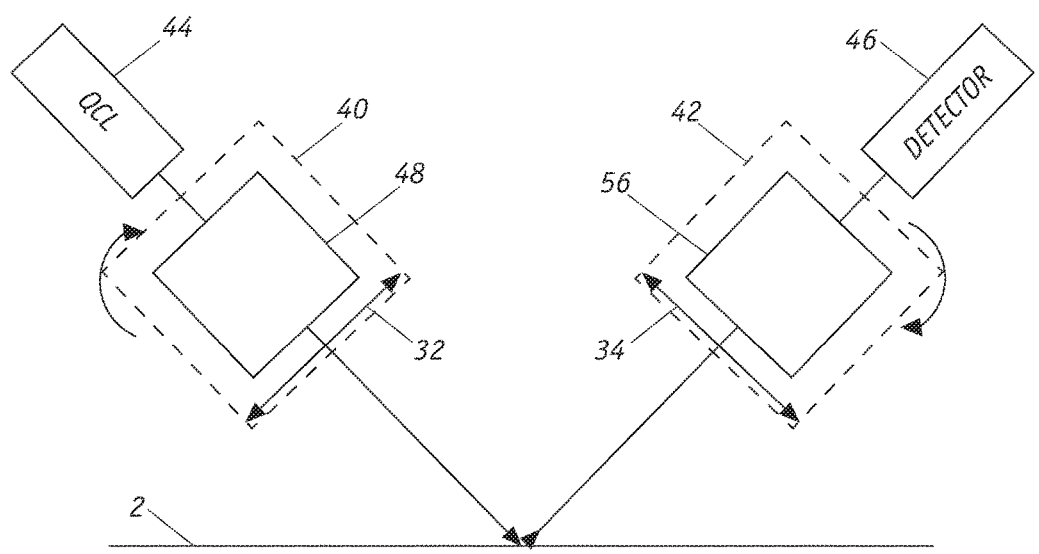

FIG. 4 represents another configuration of the caliper sensor that includes quantum cascade laser 44 with associated conditioning optics 40 and detector 46 with associated conditioning optics 42. The conditioning optics 40, comprising a focusing lens 32 and a prism 48, is mounted on a rotational mechanism that generates encoder signals, and allows changes to and determination of the incident angle on the web 2. Optionally, the focusing lens and prism are mounted on a translation stage for signal optimization. Similarly, conditioning optics 42 has a focusing lens 34 and a prism 56 that allow signal optimization at the detector 46. In operation, QCL 44 generates a laser beam that is directed onto a stationary position on web 2 at an initial incident angle through conditioning optics 40. Synchronized movement of both prisms in conditioning optics 40 and 42 allows scanning of the radiation beam from QCL 44 over a desired range of incident angle while maintaining the spot position onto the web and maximizing signal at detector 46. For example, a 2 inch polyethylene cube with a 8 inch polyethylene focusing lens in conditioning optics 40 and 42 will give a 7 degree variation on the predetermined initial incident angle on the web 2. The lenses and prisms of conditioning optics 40 and 42 preferred material is polyethylene because of the high transmission range bandwidth from 16-2500 um, but could be made of Zinc Selenide (ZnSe), Silicon (Si), Thallium Bromide/Iodide (KRS-5) or Caesium Iodide (CsI) which are all good in the infrared and far-infrared range.

Figure 5:
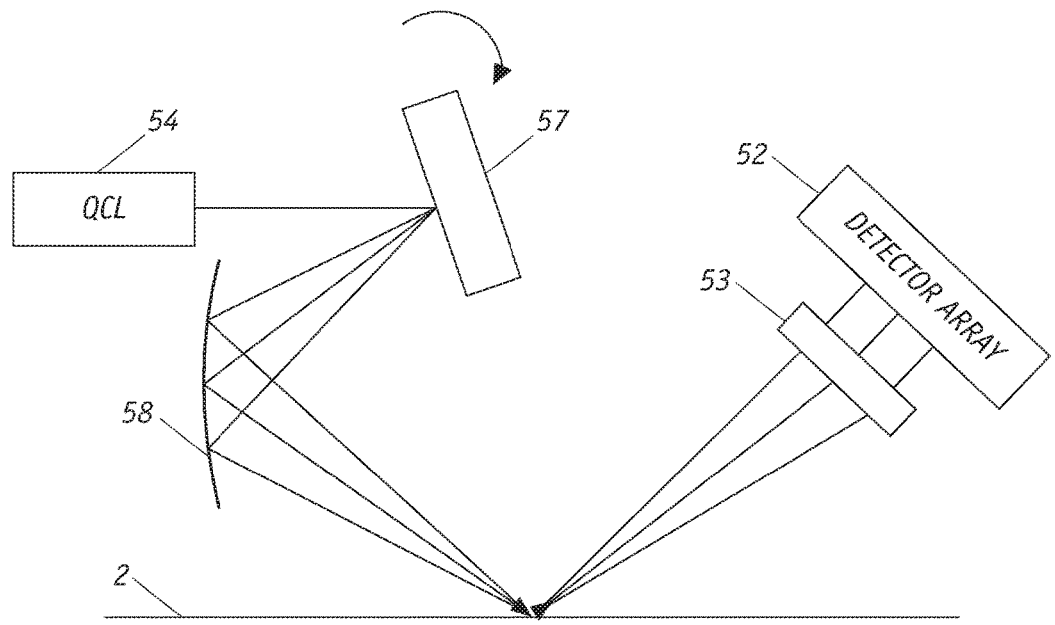

FIG. 5 depicts a caliper sensor structure that employs a detector array 52, associated optics 53 (such as a lens or micro lens array) along with a QCL 54, rotatable turning mirror 57, and relay mirror 58. A preferred detector array comprises a linear array of discrete photodiodes configured to measure the intensity of the reflected radiation from a stationary position on web 2 that is reflected at different angles without moving the detector array or optics to focus the reflected radiation into the detector array. In operation, radiation from QCL 54 is directed by turning mirror 57 onto a stationary position on web 2 at an initial angle of incident and the resulting reflected radiation is captured by detector array 52. Subsequently, the angle of incidence is changed by rotating the turning mirror to a second position and the resulting reflected radiation is captured by detector array 52. This process ensures the radiation from QCL 54 is scanned onto web 2 over the desired range of incident angles.

Figure 6:
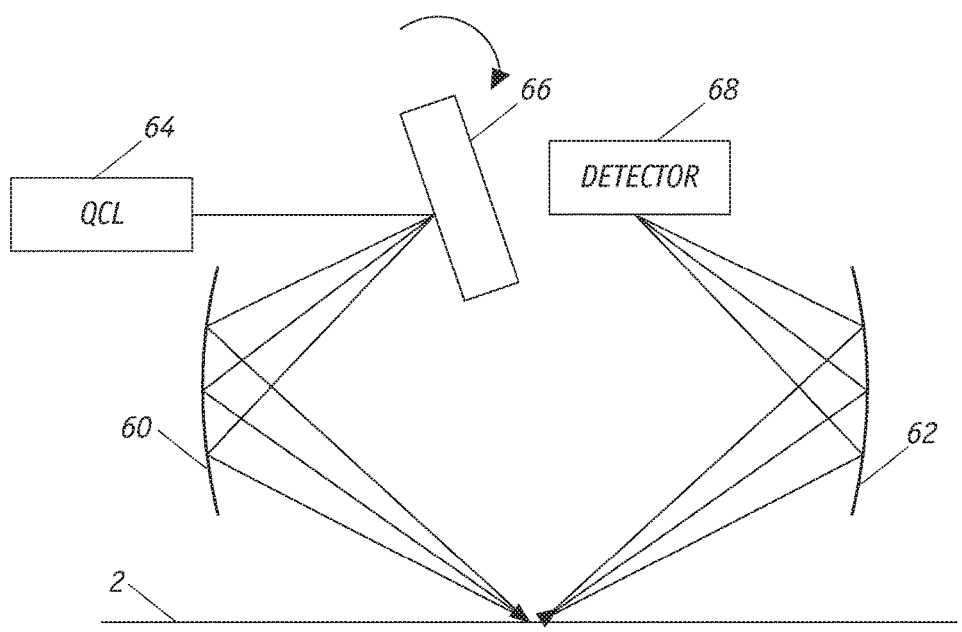

FIG. 6 illustrates a caliper sensor structure that employs a QCL 64, rotatable turning mirror 66, relay mirror 60, focusing optics 62 and detector 68. The focusing optics 62 focuses reflected radiation into detector 68. More than one mirror, lens, or combination may be used.

Figure 7:
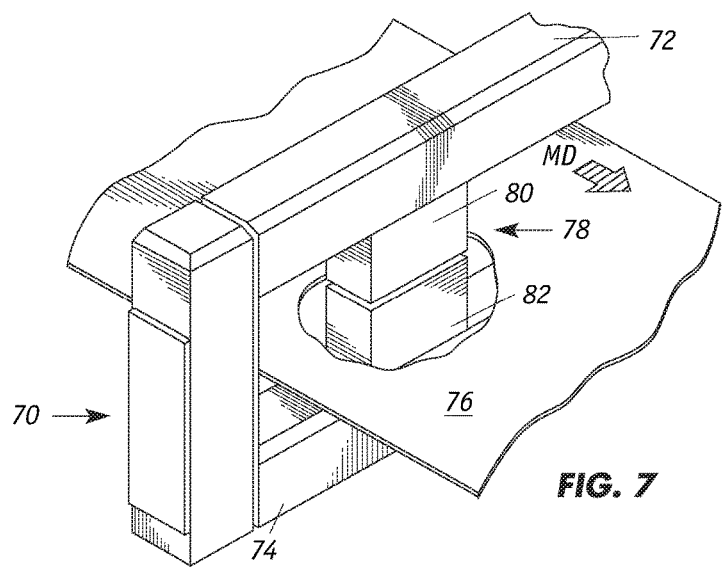
FIG. 7 shows a sheet making system implementing a single-sided caliper sensor in a dual head scanner.

FIG. 7 illustrates a scanning sensor system 70 whereby the sensor is incorporated into a dual head scanner 78 that measure the caliper of sheet 76 during continuous production. Scanner 78 is supported by two transverse beams 72, 74 on which are mounted upper and lower scanning heads 80, 82. The operative faces of the lower and upper scanner heads 80, 82 define a measurement gap that accommodates sheet 76. In one particular implementation of the caliper sensor, both the QCL and detector of the sensor are incorporated into scanner head 80, which moves repeatedly back and forth in the cross direction across the width of sheet 76, which moves in the machine direction (MD), so that the thickness of the entire sheet may be measured.

When the sensor is operating in the reflective mode as illustrated in FIG. 2, both the radiation source and receiver are housed within upper scanner head 80. When operating in the transmissive mode, a radiation source is positioned in the upper scanning head 80 while the radiation receiver is positioned in the lower scanning head 82.

The movement of the dual scanner heads 80, 82 is synchronized with respect to speed and direction so that they are aligned with each other. The radiation source produces an illumination (spot size) on the sheet 76 as the sensor moves repeatedly back and forth in the CD across the width of the moving sheet 76, so that the thickness of the entire sheet can be monitored. The caliper sensor of the present invention directs a beam of radiation at the same spot on a sheet while varying the incident beam angle around that spot or pivot. In this regard, the time scale over which the angle is varied needs to be fast enough so that the length viewed by the sensor (while a scanner head is moving) in the cross-direction direction is minimized. The scanning period is typically below 100 ms and preferably around 10 ms. The rotating and focusing elements ensure that the spot position on the sheet stays the same while varying the incident angle.

Figure 8:
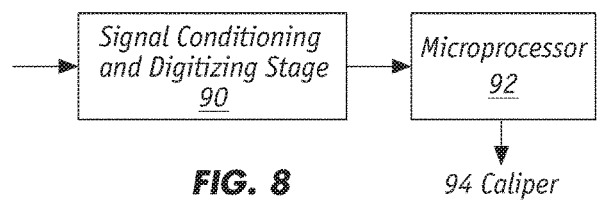
FIG. 8 is a diagram of a system employing process measurements to calculate the caliper of the web.

FIG. 8 depicts a process for controlling the manufacture of paper or other porous membranes or similar webs by continuously measuring the caliper of the web. Digitized signals representing the intensity of the measured radiation reflected from the web as the range of incident angles is scanned is generated by the signal conditioning and digitizing stage 90 and is employed by microprocesser 92 to calculate caliper 94 signals which can control actuators upstream and/or downstream of scanner system 70 (FIG. 7) to regulate production mechanisms in response to the caliper measurements.

Figure 9:
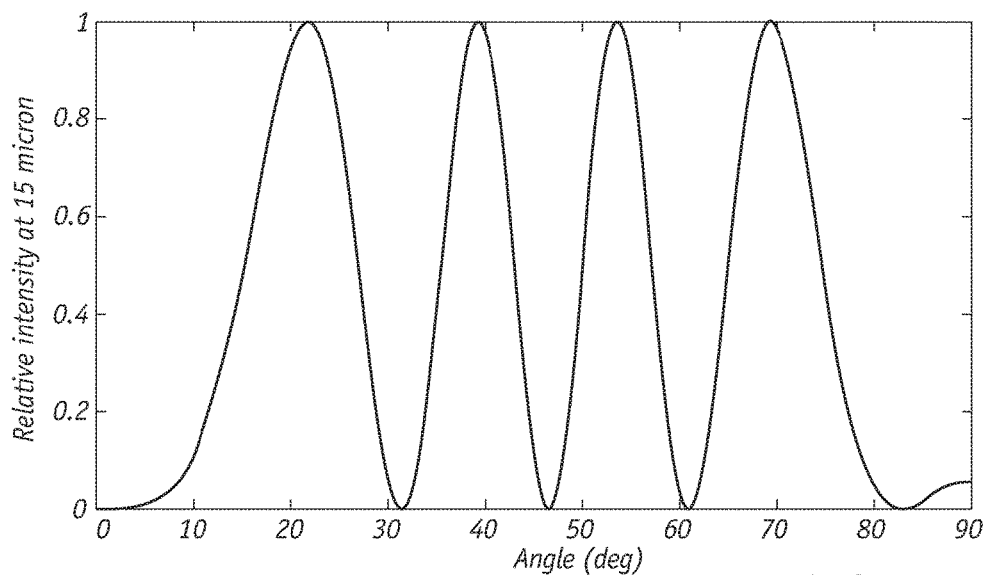
FIG. 9 is a graph of intensity vs. angle illustrating fringe interference signal for an 80 microns thick product at λ=15 microns and with the index of refraction assumed to be 1.5.

A particular feature of mid infrared radiation is that the longer wavelengths compared to visible or near infrared make it less sensitive to scatter by the web surface irregularities or roughness. Furthermore, mid infrared wavelengths are of the same order of magnitude as the thickness of typical web products such as paper and plastic films. The combination of the two results in interference fringes with high enough visibility that they can be measured and analyzed. A radiation transmission window through water exists at around a wavelength, $\lambda_0$ of approximately 22 microns. That is, the total amount of transmitted radiation detected at this wavelength is least sensitive to water. Thus, using radiation as this wavelength is particularly suited for in measuring the thickness of paper, especially paper having a thickness typically in the range of 10 microns to 200 microns, FIG. 9 illustrates the expected fringe interference that is formed using the caliper sensor of the present invention. The web is 80 microns thick and has an index of refraction of 1.5 using radiation with a wavelength of 15 microns.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A non-contacting caliper sensor for measuring the thickness of a moving web of scattering material having a first side and a second side, comprising:
   a. a substantially monochromatic laser that provides a beam of incident radiation that has a wavelength in the 3-50 micron range;
   b. means for directing the incident radiation toward a single spot on an exposed outer surface on the first side of the moving web wherein the incident radiation reaches a fixed position on the exposed surface at an angle of incidence of from 0 to 60 degrees with respect to the moving web surface normal;
   c. means for detecting the interference pattern which forms by superposition of a first radiation reflected from the exposed outer surface and a second radiation reflected from an inner surface of the second side; and
   d. means for analyzing the interference pattern to calculate the thickness of the moving web at the single spot.

2. The non-contacting caliper sensor of claim 1 wherein the laser is a quantum cascade laser that is tuned to emit at a wavelength substantially transmitted by the moving web.

3. The non-contacting caliper sensor of claim 1 wherein the means for directing the incident radiation comprises a driven closed-loop rotating mirror system that sets the angle of incidence.

4. The non-contacting caliper sensor of claim 3 wherein the means for directing the incident laser radiation comprises:
   a. an optically flat front-surface tiltable mirror that is mounted on a first rotational axis and adjusted so that its centerline of the first rotational axis is coincident with a plane of a reflective surface of the optically flat mirror and having a laser beam impingement point that is coincident with the first rotational axis; and
   b. a fixed concave front-surface mirror with a figure of revolution such that a laser beam impinging on the optically flat front surface mirror and relayed onto the fixed concave front-surface mirror is focused and imaged onto the first surface of the web.

5. The non-contacting caliper sensor of claim 4 wherein the means for detecting the interference pattern comprises:

a. a fixed concave front-surface mirror with a figure of revolution such that the interference pattern formed from reflected laser light from the moving web is focused and directed toward an optically flat front surface movable mirror; and b. an optically flat front surface movable mirror that is mounted on a second rotational axis and adjusted so that the centerline of the second rotational axis is coincident with the reflective surface of the optically flat mirror and so that the interference pattern is directed and focused onto an infrared radiation sensitive detector.

6. The non-contacting caliper sensor of claim 3 wherein the means for directing the incident laser radiation comprises:

a. a first optically flat front-surface tiltable mirror that is mounted on a first rotational axis and adjusted so that its centerline of the first rotational axis is coincident with a plane of a reflective surface of the first optically flat front-surface tiltable mirror and having a laser beam impingement point that is coincident with the first rotational axis; and b. a second optically flat front-surface tiltable mirror that is mounted on a second rotational axis and adjusted so that its centerline of the second rotational axis is coincident with a plane of the reflective surface of the second optically flat front-surface tiltable mirror.

7. The non-contacting caliper sensor of claim 6 wherein the means for detecting comprises:

a. a third optically flat front-surface tiltable mirror that is mounted on a third rotational axis and adjusted so that its centerline of the third rotational axis is coincident with a plane of a reflective surface of the third optically flat front-surface tiltable mirror and directs an image of the interference pattern; and b. a fourth optically flat front-surface tiltable mirror that is mounted on a fourth rotational axis and adjusted so that its centerline of the fourth rotational axis is coincident with a plane of a reflective surface of the second optically flat front-surface tiltable mirror and that relays the image of the interference pattern from the third optically flat front-surface tiltable mirror to an infrared radiation sensitive detector.

8. The non-contacting caliper sensor of claim 3 wherein the means for directing radiation of the interference pattern comprises a pair of facing concave front-surface mirrors with a figure of revolution such that off-axis specularly reflected laser light forming the interference pattern from the moving web is reflected and directed toward an infrared radiation sensitive detector while the axial laser light forming the interference pattern is transmitted directly toward the infrared radiation sensitive detector without reflection.

9. The non-contacting caliper sensor of claim 3 wherein the means for detecting the interference pattern is received by an infrared radiation sensitive detector array that spans the range of angles of the reflected interference pattern.

10. The non-contacting caliper sensor of claim 3 wherein the means for directing the incident radiation comprises conditioning optics that are coupled to the quantum cascade laser and mounted on an electrically driven translation and rotation stage such as to illuminated a spot position on the outer side of the first surface of the moving web which is stationary while simultaneously positioned at a desired illumination angle and translated to hold the illuminated spot position constant.

11. The non-contacting caliper sensor of claim 10 wherein the means for detecting the interference pattern comprises a second set of conditioning optics that is mounted on a second electrically driven translation and rotation stage and controlled such that the illuminated spot position on the outer surface of the first surface of the moving web is maintained on an axis of the second conditioning optics and the axis is maintained parallel to the beam axis with the output being directed to an infrared radiation sensitive detector.

12. The non-contacting caliper sensor of claim 1 wherein the moving web has a thickness in the range of 10 microns to 200 microns.

13. The non-contacting caliper sensor claim 1 wherein the moving web comprises paper or plastic made of polyethylene, polypropylene, polyethylene terephthalate, polytetrafluoroethylene or polyvinyl chloride.

14. The non-contacting caliper sensor of claim 1 wherein the moving web comprises paper and the radiation has a wavelength of about 22 microns.

15. The non-contacting caliper sensor claim 1 wherein the moving web comprises porous plastic that is made of polyethylene, polypropylene, polyethylene terephthalate, polytetrafluoroethylene or polyvinyl chloride.

16. A non-contacting caliper sensor for measuring the thickness of a moving web of scattering material having a first side and a second side, comprising:

a. a quantum cascade laser that provides a beam of incident radiation that has a wavelength in the 3-50 micron range;

b. means for directing the incident radiation toward a single spot on an exposed outer surface on the first side of the moving web wherein the incident radiation reaches a fixed position on the exposed surface at an angle of incidence of from 0 to 60 degrees with respect to the moving web surface normal;

c. means for detecting the interference pattern which forms by superposition of a first radiation reflected from the exposed outer surface and a second radiation reflected from an inner surface of the second side; and d. means for calculating the thickness of the moving web at the single spot by utilizing a relationship among the laser beam incident angle, wavelength, index of refraction of the web, and web thickness.

17. The non-contacting caliper sensor of claim 16 wherein the means for calculating the thickness is configured to analyze the interference pattern to calculate the thickness of the moving web.

18. The non-contacting caliper sensor of claim 17 wherein the means for calculating the thickness is configured to apply least-squares fitting of the interference pattern intensity distribution with laser beam incident angle to a mathematical relationship by using web thickness as a fitting parameter.

19. The non-contacting caliper sensor of claim 16 wherein the means for calculating the thickness is configured to measure the occurrence of the interference minima.

20. The non-contacting caliper sensor of claim 16 wherein the moving web has a thickness in the range of 10 microns to 200 microns and wherein the moving web comprises paper or plastic made of polyethylene, polypropylene, polyethylene terephthalate, polytetrafluoroethylene or polyvinyl chloride.

* * * * *